(12) United States Patent
Kim (10) Patent No.: US 10,167,038 B2
(45) Date of Patent: Jan. 1, 2019

(54) SELF-BALANCING SCOOTER WITH FOLDABLE FOOTHOLD FOR ADDITIONAL RIDER

(71) Applicant: Joon-Hyung Kim, Seoul (KR)

(72) Inventor: Joon-Hyung Kim, Seoul (KR)

(73) Assignee: ROBO3 CO., LTD., Seoul (KR)

( * ) Notice: Subject to any disclaimer, the term of this patent is extended or adjusted under 35 U.S.C. 154(b) by 50 days.

(21) Appl. No.: 15/440,008

(22) Filed: Feb. 23, 2017

(65) Prior Publication Data

US 2018/0208263 A1 Jul. 26, 2018

(30) Foreign Application Priority Data

Jan. 24, 2017 (KR) ........................ 10-2017-0010808

(51) Int. Cl.
| | | |
|---|---|---|
| B62K 27/00 | (2006.01) | |
| B62K 11/00 | (2006.01) | |
| B62K 15/00 | (2006.01) | |
| B62J 25/00 | (2006.01) | |
| B62K 7/04 | (2006.01) | |
| B62K 13/00 | (2006.01) | |

(52) U.S. Cl.
CPC ............ B62K 11/007 (2016.11); B62J 25/00 (2013.01); B62K 7/04 (2013.01); B62K 13/00 (2013.01); B62K 15/00 (2013.01); B62K 15/006 (2013.01); B62K 27/003 (2013.01); B62K 2015/005 (2013.01); B62K 2207/04 (2013.01)

(58) Field of Classification Search
CPC ................ B62K 11/007; B62K 15/006; B62K 2015/005
USPC .................................................. 180/218, 6.5
See application file for complete search history.

(56) References Cited

U.S. PATENT DOCUMENTS

| | | | | |
|---|---|---|---|---|
| 6,435,535 B1 * | 8/2002 | Field | .................... | B62D 51/008 180/218 |
| 7,000,933 B2 * | 2/2006 | Arling | .................. | B62D 51/008 180/218 |
| 7,467,175 B2 * | 12/2008 | Simkins | ........... | H03K 19/17732 708/523 |
| 7,635,037 B2 * | 12/2009 | Treadwell | ............... | B62B 5/005 180/19.3 |
| 7,810,591 B2 * | 10/2010 | Yamano | .................. | B62D 51/02 180/65.1 |
| 7,841,291 B1 * | 11/2010 | Milanovich | ........... | A01M 29/18 116/137 A |

(Continued)

Primary Examiner — Tony H Winner
(74) Attorney, Agent, or Firm — John K. Park; Park Law Firm (57) ABSTRACT

Disclosed is a self-balancing scooter with a foldable foothold for an additional rider. The self-balancing scooter includes: a housing; a controller mounted inside the housing for controlling running and direction change; motors respectively mounted at both sides of the housing; wheels respectively mounted on shafts of the motors; a battery mounted on the bottom surface of the housing; a riding board mounted on the upper part of the housing to allow a main rider to put feet; a foldable foothold attached to the side wall of the riding board to allow an additional rider to put feet; casters mounted at one side of the foldable foothold; a fitting hole formed at the other side of the foldable foothold; and a bracket assembled to the fitting hole through a rotary shaft and attached to the side wall of the riding board, the bracket having assembly holes.

1 Claim, 8 Drawing Sheets

(56) References Cited

U.S. PATENT DOCUMENTS 7,866,429 B2 * 1/2011 Ishii .................. B62D 37/00
                                                      180/218
9,744,095 B1 * 8/2017 Mazzei .................. A61H 3/04

* cited by examiner

SELF-BALANCING SCOOTER WITH FOLDABLE FOOTHOLD FOR ADDITIONAL RIDER

BACKGROUND OF THE DISCLOSURE

Field of the Disclosure

The present disclosure relates to a self-balancing scooter with a foldable foothold for an additional rider, and more particularly, to a self-balancing scooter with a foldable foothold for an additional rider, which does not cause overload to rotary power of the self-balancing scooter manufactured for one rider even though the entire load increases when a main rider and an additional rider get on the self-balancing scooter, thereby ensuring stable running.

Background Art

Figure 1:
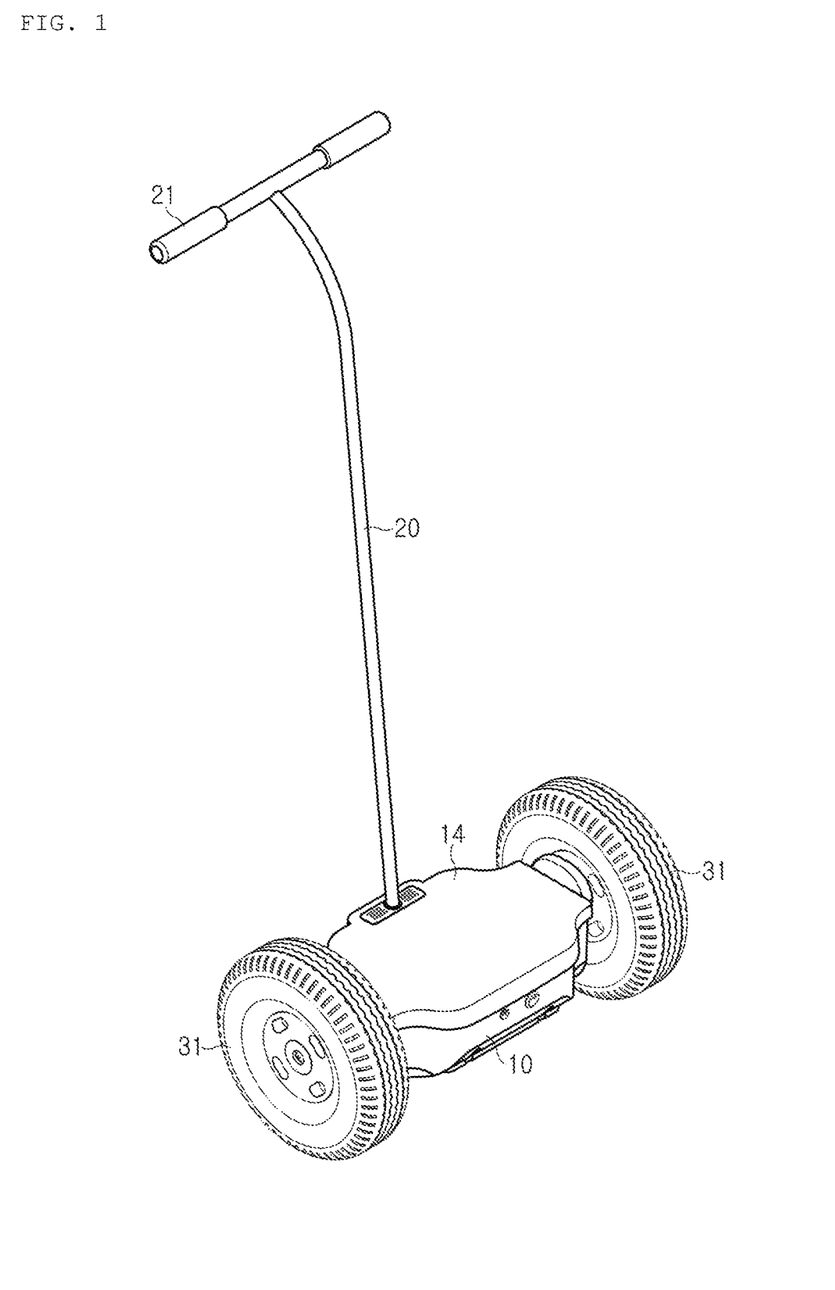
FIG. 1 is a perspective view of a self-balancing scooter according to a related art.
Figure 2:
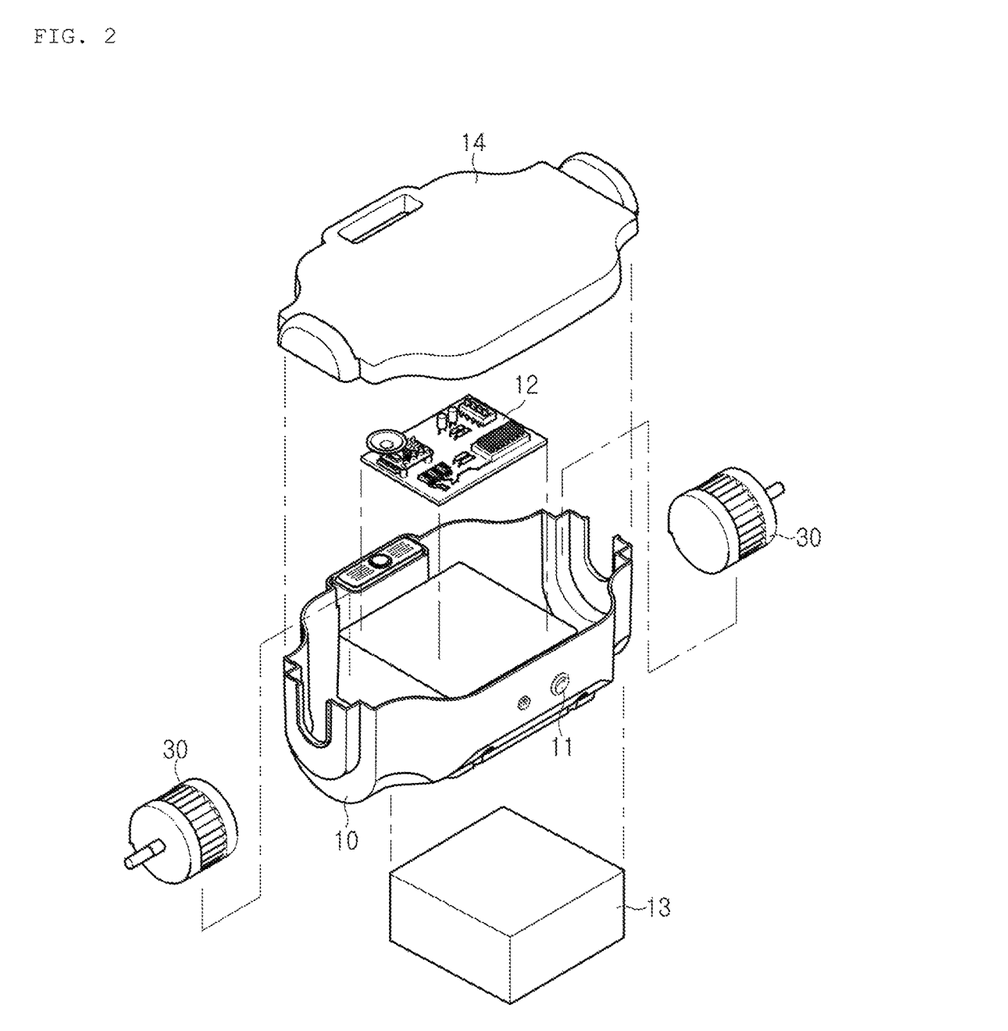
FIG. 2 is an exploded perspective view showing a housing of the self-balancing scooter according to the related art.

FIG. 1 is a perspective view of a self-balancing scooter according to a related art, and FIG. 2 is an exploded perspective view showing a housing of the self-balancing scooter according to the related art.

As shown in FIGS. 1 and 2, the self-balancing scooter according to the related art includes: a housing 10 in which a controller 12 and various components are embedded; a riding board 14 mounted at an upper part of the housing 10; motors 30 respectively mounted at both sides of the housing 10; wheels 31 respectively mounted at shafts of the motors 30; a switch 11 mounted at one side of the housing 10 to supply electric power; and a battery 13 mounted on the bottom surface of the housing 10.

Moreover, the self-balancing scooter according to the related art further includes a fixed shaft 20 standing at one side of the riding board 14 and a handle 21 formed at an upper part of the fixed shaft 20, so that a rider on the riding board 14 can drive while keeping an erect state of the self-balancing scooter.

That is, in order to keep a balance of the wheels during running of the self-balancing scooter, because the controller 12 controls various electric processors including a gyro sensor, the scooter may run back and forth and change directions to right and left directions while keeping the balance of the wheels 31 in real time.

For instance, when the rider grasping the handle 21 leans the upper half of his or her body at a predetermined angle toward the front after getting on the riding board 14, various sensors including the gyro sensor embedded in the housing 10 read the slope. In order to prevent the scooter from falling forward due to the slope, when the rider actuates the wheels 31 in the direction of the slope as much as the slope is removed, the position of the scooter is corrected and the scooter may run in safety while keeping the erect state.

However, the conventional self-balancing scooter illustrated in FIG. 1 has a disadvantage in that, when an additional rider gets on the scooter, due to an increase of load applied to the riding board 14, it is difficult to run in stability because overload occurs to the rotary power of the motors 30 driven in engagement with the rider's weight and the slope of the fixed shaft 20.

In other words, the rotary power of the motors 30 of the conventional self-balancing scooter illustrated in FIG. 1 is set as a scooter for one rider. However, when an additional rider gets on the scooter, due to the increase of load applied from above the riding board 14, the rotary power of the motors 30 exceeds a permissible range of the load to react stably, so overload occurs to the rotary power of the motors 30. Therefore, the conventional self-balancing scooter has a problem in safety in that the conventional self-balancing scooter falls down or shakes since starting and running unstably.

In the meantime, the above-mentioned disadvantages may be solved if the conventional self-balancing scooter illustrated in FIG. 1 is manufactured in such a way that the rotary power of the motors 30 fit a tandem scooter. However, if so, due to an increase of volume of various components including the motors 30, because the total volume of the self-balancing scooter increases, it is inconvenient to load it in a trunk of a vehicle or store or carry it, and manufacturing costs rise.

SUMMARY OF THE DISCLOSURE

Accordingly, the present disclosure has been made in view of the above-mentioned problems occurring in the prior art, and it is an object of the present disclosure to provide a self-balancing scooter with a foldable foothold for an additional rider, which does not cause overload to rotary power of motors even if two persons, namely, a main rider and an additional rider get on the self-balancing scooter manufactured for one rider, thereby ensuring stable running.

To accomplish the above object, according to the present disclosure, there is provided a self-balancing scooter with a foldable foothold for an additional rider including: a housing; a controller mounted inside the housing for controlling running and direction change; motors respectively mounted at both sides of the housing; wheels respectively mounted on shafts of the motors; a battery mounted on the bottom surface of the housing; a riding board mounted on the upper part of the housing to allow a main rider to put his or her feet thereon; a foldable foothold attached to the side wall of the riding board to allow an additional rider to put his or her feet thereon; casters mounted at one side of the foldable foothold; a fitting hole formed at the other side of the foldable foothold; and a bracket assembled to the fitting hole through a rotary shaft and attached to the side wall of the riding board, the bracket having assembly holes.

As described above, according to an exemplary embodiment of the present disclosure, the self-balancing scooter manufactured for one rider may be used as a tandem self-balancing scooter which ensures stability in driving and running when the foldable foothold is used to the self-balancing scooter according to the exemplary embodiment of the present disclosure.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENT

Hereinafter, technical structure and effect of a self-balancing scooter with a foldable foothold for an additional rider according to exemplary embodiments of the present disclosure will be described with reference to the accompanying drawings. In a case where it is determined that detailed description of well-known functions, configurations and systems related with the present disclosure and all other matters unnecessarily obscure the gist of the present disclosure, the detailed description will be omitted. Furthermore, the same elements as the related art have the same reference numerals.

Figure 3A:
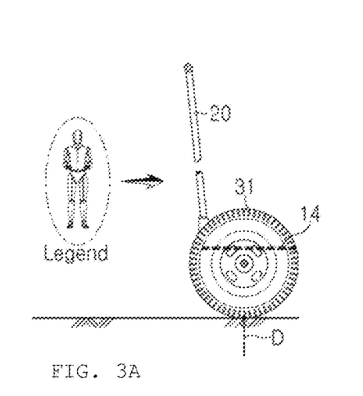
FIGS. 3A-3C and 3A'-3C' are brief views explaining problems of the self-balancing scooter according to the related art.
Figure 3B:
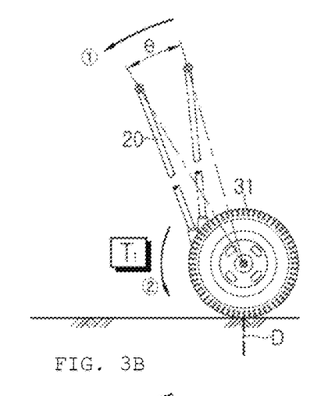
Figure 3C:
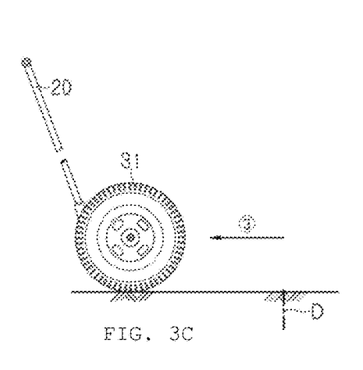

FIG. 3 is a brief view explaining problems of the self-balancing scooter according to the related art.

When one or two persons get on the conventional self-balancing scooter of FIG. 3, sizes in rotary power $T_1$ and $T_2$ will be compared with each other.

FIGS. 3A, 3B and 3C are brief views for explaining rotary power $T_1$ when one person gets on the conventional self-balancing scooter. As shown in FIG. 3A, a base line D is set to a spot where wheels 31 are put to the ground, and it is supposed that a main rider rides on a riding board 14.

When the main rider grasping a fixed shaft 20 leans the upper half of his or her body rides on the self-balancing scooter at a predetermined angle ($\theta$) in a counterclockwise direction as indicated by an arrow No. 1 of FIG. 3B, a controller 12 on which a gyro sensor reads the lean angle ($\theta$) of the fixed shaft 20.

In order to prevent the scooter from falling forward due to the lean angle ($\theta$), motors 30 rotate as much as the slope is removed, so the rotary power $T_1$ proportional to one person's vertical load is applied to the wheels 31. Then, the wheels 31 rotate in the counterclockwise direction as indicated by an arrow No. 2 of FIG. 3B and the scooter moves in the direction of an arrow No. 3 relative to the base line D as shown in FIG. 3C, so that the rider can drive in safety while keeping an erect state.

In the meantime, FIGS. 3A', 3B' and 3C' are brief views for explaining rotary power $T_2$ when two persons, namely, the main rider and an additional rider get on the conventional self-balancing scooter, as shown in FIG. 3A', the base line D is set to a spot where wheels 31 are put to the ground, and it is supposed that the main rider and the additional rider ride on the riding board 14.

When the main rider and the additional rider grasping the fixed shaft 20 lean the upper halves of their bodies at the predetermined angle ($\theta$) in the counterclockwise direction as indicated by an arrow No. 1 of FIG. 3B', the controller 12 on which the gyro sensor reads the lean angle ($\theta$) of the fixed shaft 20.

In order to prevent the scooter from falling forward due to the lean angle ($\theta$), the motors 30 rotate as much as the slope is removed, so the rotary power $T_2$ proportional to the two persons' vertical load is applied to the wheels 31. Then, the wheels 31 rotate in the counterclockwise direction as indicated by an arrow No. 2 of FIG. 3B' and the scooter moves in the direction of an arrow No. 3 relative to the base line D as shown in FIG. 3C', but moves unstably.

As described above, the two persons who ride on the scooter drive the conventional scooter unstably because the rotary power $T_2$ proportional to the two persons' vertical load is larger than the rotary power $T_1$ proportional to one person's vertical load ($T_1 < T_2$).

In other words, because strengths of rotary power $T_1$ and $T_2$ of the motors 30 actuating the wheels 31 are determined in proportion to the lean angle ($\theta$) of the fixed shaft 20 and the vertical load applied from above the wheels 31, the rotary power $T_2$ of FIGS. 3A', 3B' and 3C' proportional to the two persons' weights is larger than the rotary power $T_1$ of FIGS. 3A, 3B and 3C proportional to one person's weight ($T_1 < T_2$).

However, the conventional self-balancing scooters illustrated in FIGS. 3A, 3B, 3C, 3A', 3B' and 3C' are all scooter for one rider. When the vertical load is increased due to the additional rider besides the main rider as shown in FIGS. 3A', 3B' and 3C, the rotary power $T_2$ of the motor of the conventional self-balancing scooter for one rider exceeds a permissible range, so overload occurs to the rotary power $T_2$.

Therefore, as shown in FIGS. 3A', 3B' and 3C, in the case that two persons ride on the conventional self-balancing scooter, due to overload of the rotary power $T_2$, the wheels 31 are actuated unstably, for instance, rapidly rotates or rotates irregularly, so safe running is not ensured.

Figure 4:
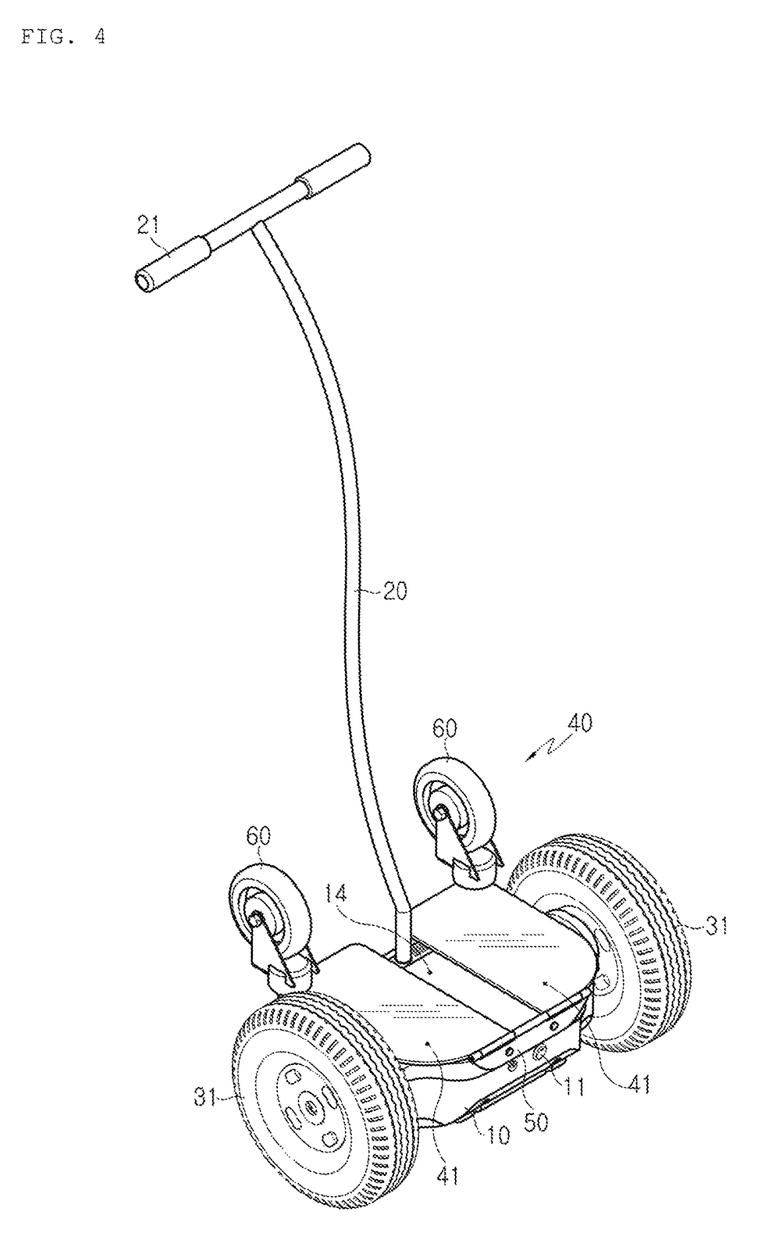
FIG. 4 is a perspective view of a self-balancing scooter with a foldable foothold for an additional rider according to an exemplary embodiment of the present disclosure.
Figure 5A:
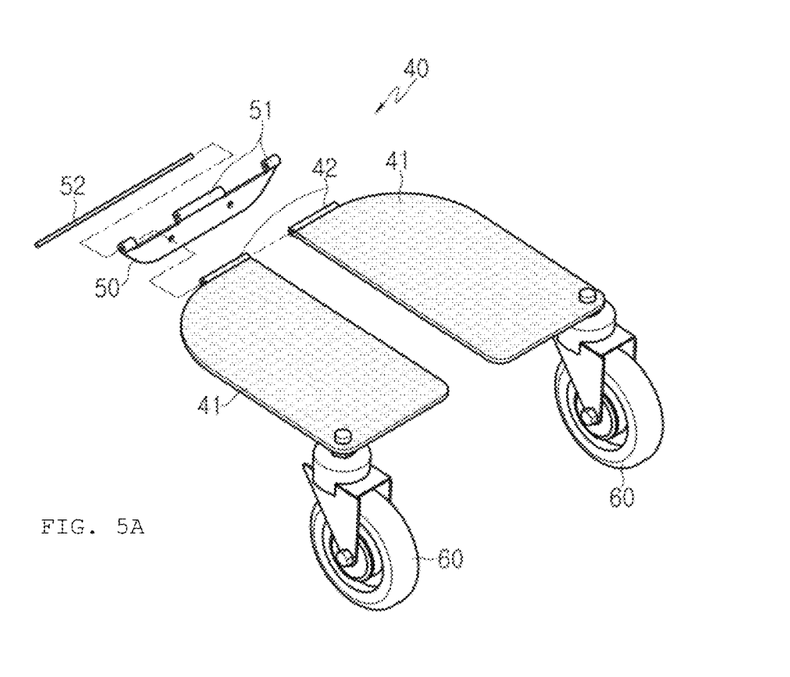
FIGS. 5A and 5B are exploded perspective views of the foldable footholds according to exemplary embodiments of the present disclosure.
Figure 5B:
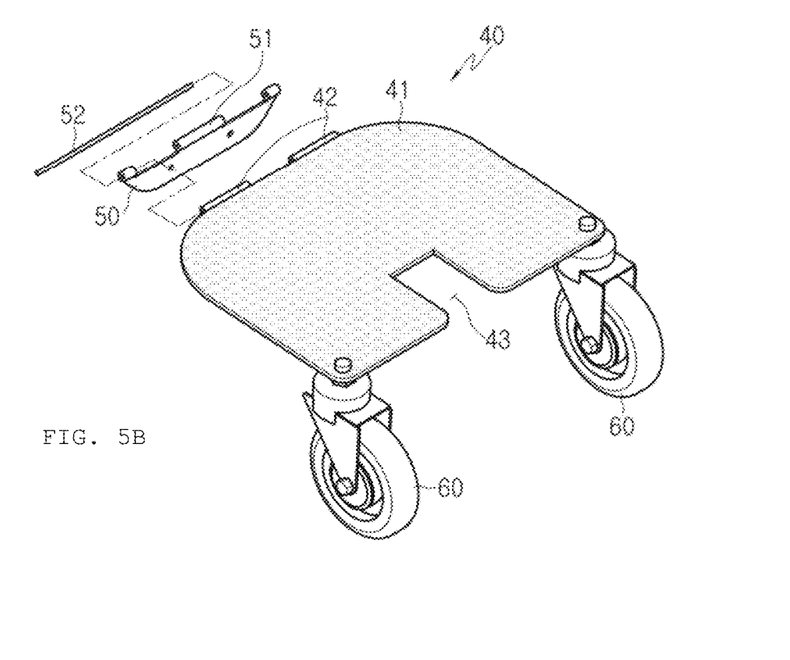

FIG. 4 is a perspective view of a self-balancing scooter with a foldable foothold for an additional rider according to an exemplary embodiment of the present disclosure, and FIG. 5 is an exploded perspective view of the foldable foothold for an additional rider according to the exemplary embodiment of the present disclosure. In order to solve the problems of the conventional self-balancing scooter, a foldable foothold 40 to prevent overload from occurring to the rotary power of the motors 30 even though an additional rider rides on the self-balancing scooter is mounted to the self-balancing scooter for one rider.

As shown in FIG. 4, the foldable foothold 40 is disposed on the riding board 14 of the self-balancing scooter at the initial stage. When one person rides on the scooter, the foldable foothold 40 is folded and located on the upper surface of the riding board 14, and when two persons ride on the scooter, the foldable foothold 40 is unfolded and is located at the direct rear of the riding board 14.

That is, as shown in FIG. 5A, the self-balancing scooter according to an exemplary embodiment of the present disclosure includes: two split-type foldable footholds 40; a caster 60 which is mounted on one side of each foldable foothold 40; and a fitting hole 42 formed at the other side of each foldable foothold 40.

Moreover, the self-balancing scooter according to an exemplary embodiment of the present disclosure further includes a bracket 50 located at the fitting hole 42. The bracket 50 includes: an assembly holes 51 formed at the upper portion of the bracket 50; and a rotary shaft 52 fit to go through the fitting hole 42 and the assembly holes 51, so that the foldable foothold 40 rotates on the rotary shaft 52.

In the meantime, differently from the split type foldable footholds 40 shown in FIG. 5A, the foldable foothold 40 illustrated in FIG. 5B is formed in an integrated type. As shown in FIG. 5B, the casters 60, the fitting hole 42, the bracket 50, the assembly holes 51 and the rotary shaft 52 of the integrated-type foot hold 40 are the same as the split-type foldable footholds 40 shown in FIG. 5A.

Because the foldable foothold 40 of FIG. 5B is formed integrally, when the foldable foothold 40 is folded and located on the riding board 14, an interference preventing groove 43 is formed at one side of the riding board 14 in order to prevent interference between the fixing shaft 20 standing at one side of the riding board 14 and one side of the foldable foothold 40.

Figure 6A:
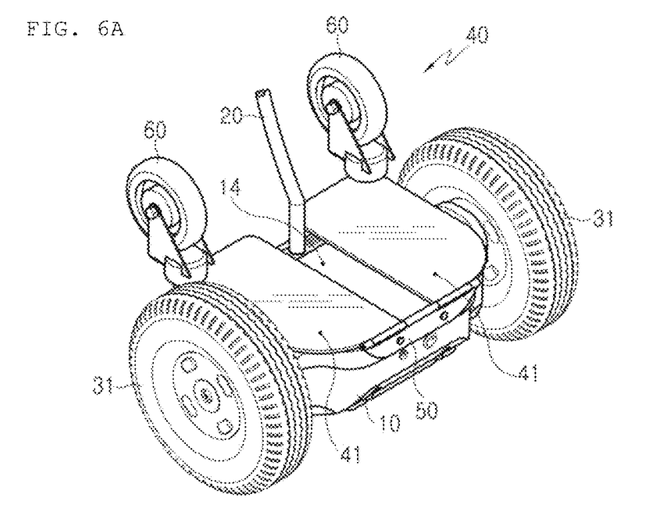
FIGS. 6A and 6B are perspective views showing a combined state of the foldable foothold according to the exemplary embodiment of the present disclosure.

FIG. 6 is a perspective view showing a combined state of the foldable foothold for an additional rider according to the exemplary embodiment of the present disclosure. As shown in FIG. 6A, the foldable foothold 40 is attached to the side wall of the riding board 14 by combining means, such as bolts or welding, through the medium of a bracket 50. When the foothold is folded and located on the upper surface of the riding board 14, the self-balancing scooter according to the exemplary embodiment of the present disclosure may be used as a single balancing scooter.

Figure 6B:
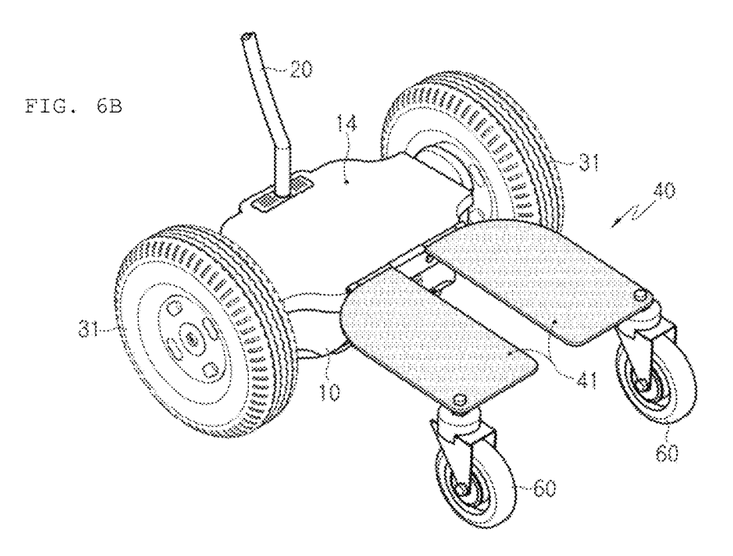

As shown in FIG. 6B, when the foldable foothold 40 is unfolded and located at the direct rear of the riding board 14, the scooter according to the exemplary embodiment of the present disclosure may be used as a tandem balancing scooter, which ensures safety in running, utilizing the single balancing scooter.

Figure 7A:
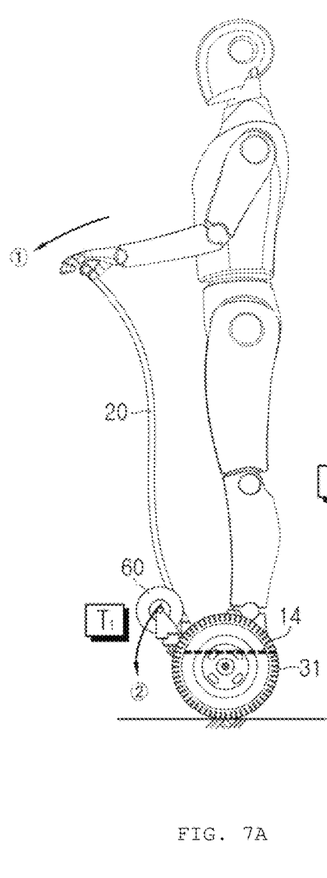
FIGS. 7A and 7B are brief views for explaining safety of the self-balancing scooter with the foldable foothold for an additional rider according to the exemplary embodiment of the present disclosure.
Figure 7B:
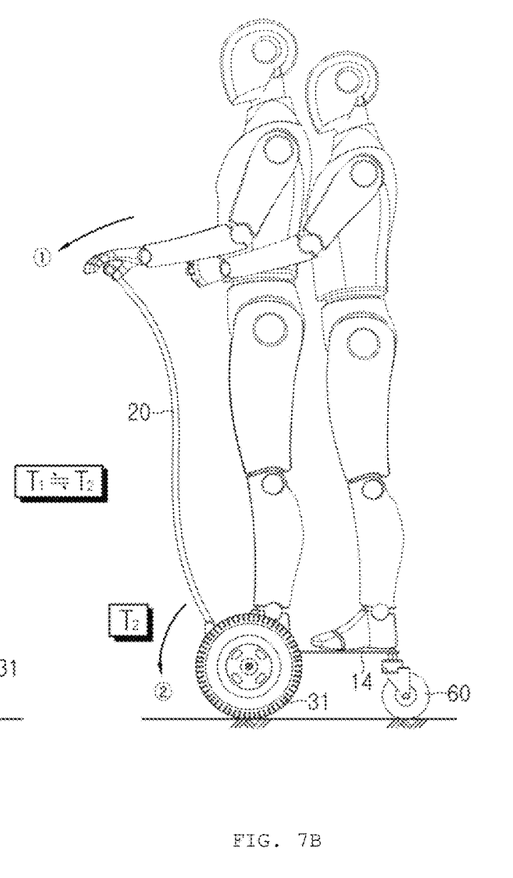
Figure 8A:
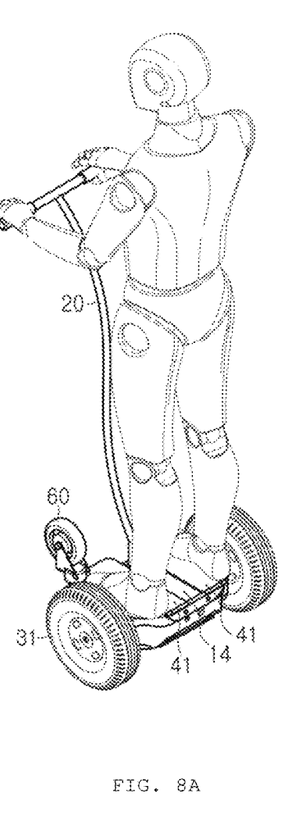
FIGS. 8A and 8B are perspective views showing a state where one or two users get on the self-balancing scooter with the foldable foothold for an additional rider according to the exemplary embodiment of the present disclosure.
Figure 8B:
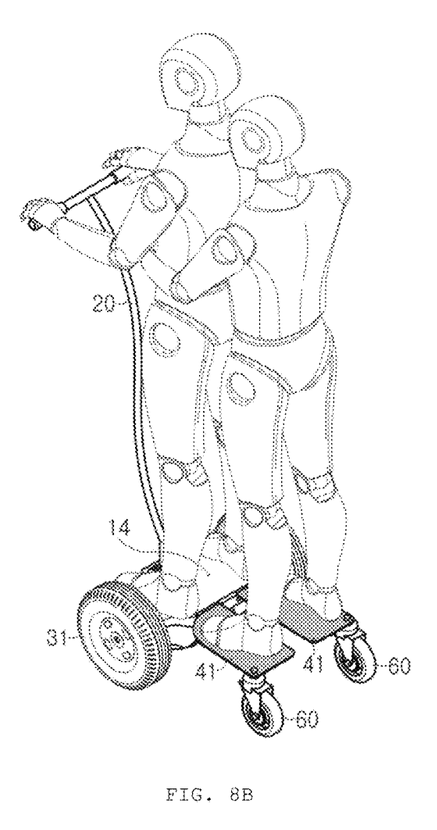

FIGS. 7A and 7B are brief views for explaining safety of the self-balancing scooter with the foldable foothold for an additional rider according to the exemplary embodiment of the present disclosure, and FIGS. 8A and 8B are perspective views showing a state where one or two users get on the self-balancing scooter with the foldable foothold for an additional rider according to the exemplary embodiment of the present disclosure.

As shown in FIGS. 7A and 8A, when the main rider on the folded foothold 40 while grasping the fixed shaft 20 leans the upper half of his or her body rides on the self-balancing scooter at the predetermined angle (θ) in the counterclockwise direction as indicated by an arrow No. 1 of FIG. 7A after folding the foldable foothold 40 and locating it on the upper surface of the riding board 14, the controller 12 on which the gyro sensor reads the lean angle (θ) of the fixed shaft 20.

In order to prevent the scooter from falling forward due to the lean angle (θ), motors 30 rotate as much as the slope is removed, so the rotary power $T_1$ proportional to one person's vertical load is applied to the wheels 31. Then, the wheels 31 rotate in the counterclockwise direction as indicated by an arrow No. 2 of FIG. 7A and the scooter runs in safety while keeping an erect state.

In the meantime, FIG. 7B is a brief view for explaining rotary power $T_2$ when two persons, namely, the main rider and an additional rider get on the self-balancing scooter with the foldable foothold for an additional rider according to the exemplary embodiment of the present disclosure.

As shown in FIGS. 7B and 8B, when an additional person rides on the self-balancing scooter for one rider, the rider unfolds the foldable foothold 40 disposed on the upper surface of the riding board 14 and locates it at the direct rear of the riding board 14.

After the main rider rides on the riding board 14 and the additional rider rides on the foldable foothold 40, when the main rider grasping the fixed shaft 20 leans the upper halves of his or her body in the counterclockwise direction as indicated by an arrow No. 1 of FIG. 7B, the controller 12 on which the gyro sensor reads the lean angle of the fixed shaft 20. In order to prevent the scooter from falling forward due to the lean angle (θ), when the main rider rotates the motors 30 as much as the slope is removed, even if the two persons ride on the self-balancing scooter, the rotary power $T_2$ proportional to one person's vertical load is applied from above the wheels 31. Then, the wheels 31 rotate in the counterclockwise direction as indicated by an arrow No. 2 of FIG. 7B and the scooter runs in safety while keeping the erect state.

As described above, even if two persons ride on the self-balancing scooter according to the exemplary embodiment of the present disclosure as shown in FIG. 7B, the self-balancing scooter according to the exemplary embodiment of the present disclosure can run stably because the vertical load applied from above the wheels 31 shows an approximate value when two persons ride on as shown in FIG. 7B as well as when one person rides on as shown in FIG. 7A.

In other words, because the rotary power $T_1$ when one person rides on as shown in FIG. 7A and the rotary power $T_2$ when two persons ride on as shown in FIG. 7B show the approximate value ($T_1 \approx T_2$), the self-balancing scooter manufactured for one rider according to the exemplary embodiments of the present disclosure may be used as a tandem self-balancing scooter which ensures stability in running.

What is claimed is:

1. A self-balancing scooter with a foldable foothold for an additional rider comprising:
    a housing;
    a controller mounted inside the housing for controlling running and direction change;
    motors respectively mounted at both sides of the housing;
    wheels respectively mounted on shafts of the motors;
    a battery mounted on a bottom surface of the housing;
    a riding board mounted on an upper part of the housing for allowing a main rider to put his or her feet thereon;
    a foldable foothold attached to a side wall of the riding board and configured to be folded on an upper surface of the riding board for a single rider and to be unfolded and disposed at a rear of the riding board for allowing an additional rider to put his or her feet on the unfolded foldable foothold;
    casters mounted at one side of the foldable foothold;
    a fitting hole formed at another side of the foldable foothold; and
    a bracket assembled to the fitting hole through a rotary shaft and attached to the side wall of the riding board, the bracket having assembly holes.

* * * * *